No. 609,502. Patented Aug. 23, 1898.
W. EGGERT, Jr.
FERTILIZER ATTACHMENT FOR CULTIVATORS.
(Application filed Nov. 20, 1897.)

(No Model.)

Witnesses
Caspar Simonds
C. E. Buckland

Inventor
William Eggert Jr.
By W. E. Simonds
Attorney

UNITED STATES PATENT OFFICE.

WILLIAM EGGERT, JR., OF BLOOMFIELD, CONNECTICUT.

FERTILIZER ATTACHMENT FOR CULTIVATORS.

SPECIFICATION forming part of Letters Patent No. 609,502, dated August 23, 1898.

Application filed November 20, 1897. Serial No. 659,234. (No model.)

*To all whom it may concern:*

Be it known that I, WILLIAM EGGERT, Jr., a citizen of the United States of America, residing at Bloomfield, in the county of Hartford and State of Connecticut, have invented a certain new and useful Fertilizer Attachment for Cultivators, of which the following is a description, reference being had to the accompanying drawings, wherein—

Figure 1:
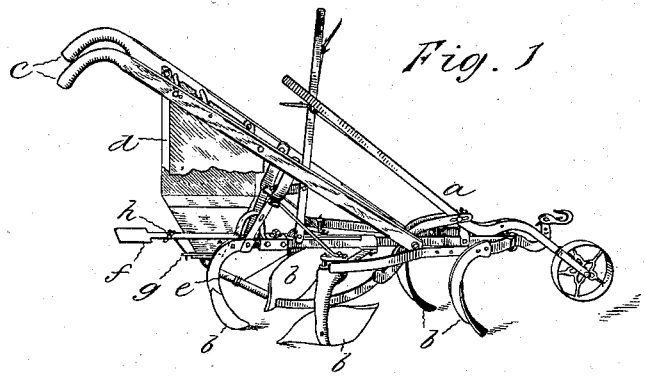
Figure 2:
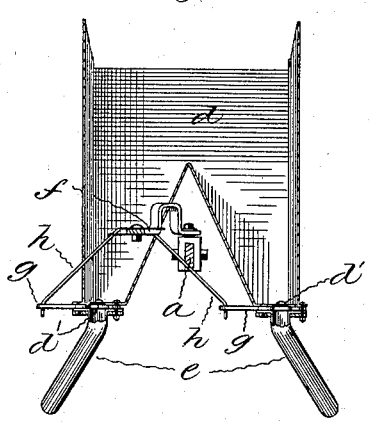
Figure 3:
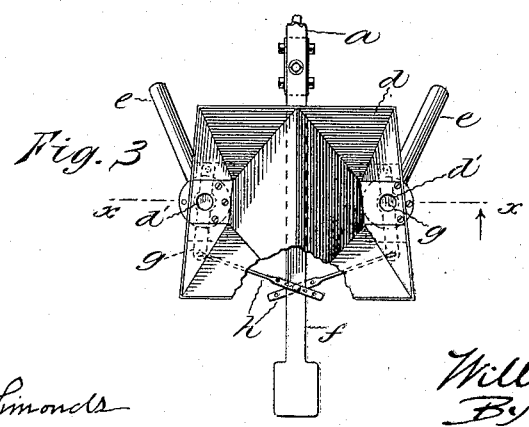

Figure 1 is a perspective view with one of the outlets of the fertilizer-hopper represented as broken away. Fig. 2 is a view in vertical section, on an enlarged scale, through the fertilizer-hopper on the plane denoted by the dotted line $x\,x$ of Fig. 3. Fig. 3 is a plan view, on a similar enlarged scale, of the fertilizer-hopper.

The object of the improvement is to provide an attachment for a cultivator for containing and distributing fertilizers, having features of novelty hereinafter specifically recited in the claims.

In the accompanying drawings the letter $a$ denotes parts of the cultivator-frame, $b$ the cultivator-blades, and $c$ the cultivator-handles.

The letter $d$ denotes the hopper for containing the fertilizer. It is attached to and pendent from the cultivator-handles. It has two separate outlets $d'$, each provided with a rotarily, and therefore laterally, adjustable conduit $e$.

The letter $f$ denotes a lever for operating the gates appurtenant to the two outlets. It is pivotally attached to the frame of the cultivator and adapted to oscillate laterally midway of the two hopper-outlets. These gates open and close by limited rotary motion. The letter $h$ denotes connecting-rods running from said gates to said operating-lever, the connection with the lever being adjustable. By oscillating the operating-lever laterally the two gates may be opened and closed at the same time, or one gate may be disconnected from the lever, leaving the other gate to be alone operated by the oscillation of the operating-lever.

I claim as my improvement—

1. In combination, the cultivator, the fertilizer-hopper pendent from the cultivator-handles and provided with an outlet, the operating-lever pivotally attached to the cultivator-frame and extending rearwardly underneath the cultivator-handles, the gate for said outlet, and the connecting-rod from said lever to said gate, all substantially as described and for the purposes set forth.

2. In combination, the cultivator, the fertilizer-hopper provided with two outlets, the operating-lever adapted to oscillate midway of said outlets, the gates for said outlets, and the connecting-rods from said lever to said gates, all substantially as described and for the purposes set forth.

WILLIAM EGGERT, JR.

Witnesses:
W. E. SIMONDS,
FLORENCE M. BRAGG.